United States Patent [19]
Lehureau

[11] Patent Number: 5,745,329
[45] Date of Patent: Apr. 28, 1998

[54] MAGNETIC RECORDING/READING HEAD

[75] Inventor: Jean-Claude Lehureau, Ste Genevieve des Bois, France

[73] Assignee: Thomson-CSF, Paris, France

[21] Appl. No.: 712,491

[22] Filed: Sep. 11, 1996

[30] Foreign Application Priority Data

Sep. 12, 1995 [FR] France .................................. 95 10658

[51] Int. Cl.$^6$ ........................................ G11B 5/31
[52] U.S. Cl. ........................................ 360/126
[58] Field of Search ........................ 360/126, 123

[56] References Cited

U.S. PATENT DOCUMENTS

| | | | |
|---|---|---|---|
| 4,942,490 | 7/1990 | Lehureau | 360/126 |
| 4,980,788 | 12/1990 | Yamada et al. | 360/126 |
| 4,992,897 | 2/1991 | Deroux-Dauphin | 360/126 |
| 5,067,230 | 11/1991 | Meunier et al. | 29/603 |
| 5,089,923 | 2/1992 | Lehureau | 360/121 |
| 5,124,869 | 6/1992 | Lehureau | 360/121 |
| 5,195,006 | 3/1993 | Morikawa | 360/126 |
| 5,274,520 | 12/1993 | Matsuzuono et al. | 360/113 |

FOREIGN PATENT DOCUMENTS 0 475 397 A3  3/1992  European Pat. Off. .
1-264619  10/1989  Japan .
1-275059  11/1989  Japan .

OTHER PUBLICATIONS

Japanese Patent Abstract No. 61–120313, Jun. 7, 1986, "Thin Film Magnetic Head", Sanyo Electric Co., Ltd.
Japanese Patent Abstract No. 62–114112, May 25, 1987, "Thin Film Magnetic Head", Matsushita Electric Ind Co., Ltd.
Japanese Patent Abstract No. 59–24422, Feb. 8, 1984, "Magnetic Head", Tokyo Shibaura Denki K.K.

*Primary Examiner*—Robert S. Tupper
*Attorney, Agent, or Firm*—Oblon, Spivak, McClelland, Maier & Neustadt, P.C.

[57] ABSTRACT

This magnetic head has two magnetic poles separated by a gap. The two ends of the poles are connected by a magnetic layer located beneath these poles. This layer has a zone made of insulator material located beneath the poles. Application to magnetic heads for recording and reading on magnetic media.

4 Claims, 5 Drawing Sheets

MAGNETIC RECORDING/READING HEAD

BACKGROUND OF THE INVENTION

1. Field of the Invention

The invention relates to a magnetic recording/reading head and to the method of making it and more particularly to a planar magnetic head made of planar type thin layers. This method makes it possible, without increasing the number of technological steps, to achieve an considerable increase in the efficiency of the head and enables the use of thinner magnetic and conductive layers.

2. Description of the Prior Art

FIGS. 1a, 1b show the structure of a conventional (non-planar) type of magnetic head. This head has two stacked magnetic poles P1, P2, magnetically coupled at one end to close the magnetic circuit of the head and comprising a gap E at the other end. A magnetic field induction conductor B (coil) is located between the poles P1, P2 to induce a magnetic field in the head. The active zone of the magnetic head enabling the reading or writing of the information elements is located at the end of the gap E (to the left in FIGS. 1a, 1b). This head is formed by the deposition and photolithographic machining of the layers forming the magnetic poles, the conductors and the insulators. The carrier is then sawn close to the gap and the head is polished along a plane perpendicular to the photolithography plane. These heads require steps of polishing performed individually on each head and are therefore costly.

FIGS. 2a, 2b show a so-called planar structure head. This head has two magnetic poles 4, 5 substantially located in one and the same plane. The most distant ends of these poles are magnetically coupled to a magnetic sublayer 1 to close the magnetic circuit of the head. The closest ends are separated by a gap 6. One or more magnetic field induction conductors are located between the magnetic pole (4, 5) and the magnetic sublayer 1. This head is formed by deposition, photolithography and polishing of the surface which is done in batches. A final sawing operation is performed to separate each head. This method is a batch method for all the steps and is therefore less costly. It furthermore enables the making of matrix arrays of heads as can be seen in FIG. 3.

The planar heads have a small gap depth. This is a potential advantage since the inductance of the coil is thereby reduced. This brings about a corresponding reduction of the noise at the input of the reading preamplifier. Unfortunately, the flux must travel along a lengthy path in the magnetic poles before circumventing the plane of the coil. If the permeability of the poles is not very great, there is a leakage of the flux through this plane and this considerably reduces the efficiency of the head.

The constituent elements of a magnetic circuit are characterized by their permeance. This permeance characterizes the flux going through this element for a circulation of the unitary magnetic induction field. This circulation is homogeneous in dimension with a current and the permeance is homogeneous with an induction coefficient: Φ=Li. For a cylinder oriented along the flux lines and having a homogeneous permeability μ, the permeance depends on the section I and on the length S of the cylinder:

$$L = \mu I/S$$

The total permeance of a magnetic circuit is equal to the inductance per turn squared of the coil that goes through it.

The term "efficiency" with respect to a magnetic head is generally applied to the ratio between the circulation of the field in the gap and the current injected into the coil expressed in amperes-turns. A head is all the better as its efficiency is close to unity and as its permeance is low.

FIG. 5a shows typical values of permeance of the magnetic circuit of the head of FIG. 2. The flux flowing when the upper poles are set up tends to be short-circuited by the proximity of the lower pole. The result thereof is not only an increase in the impedance of the coil but also, owing to the limited permeability of the poles, a loss of efficiency of the head.

The invention relates to a magnetic head structure that does not have this drawback.

SUMMARY OF THE INVENTION

The invention therefore relates to a magnetic head comprising:
- a first magnetic layer;
- at least one magnetic field induction conductor positioned on this magnetic layer;
- a first zone made of an insulating material including the conductor and covering a part of the magnetic layer;
- two magnetic poles made of layers overlapping the zone made of insulator material, each pole having a first end magnetically coupled with the magnetic layer and a second end separated from the second end of the other pole by a gap that is located on the zone made of insulator material;
- wherein the plane of the first magnetic layer comprises a second zone made of insulator material located beneath the magnetic poles between the first ends and not having any magnetic material.

BRIEF DESCRIPTION OF THE DRAWINGS

The different objects and characteristics of the invention shall appear more clearly in the following description and in the appended figures, of which.

MORE DETAILED DESCRIPTION

Figure 4A:
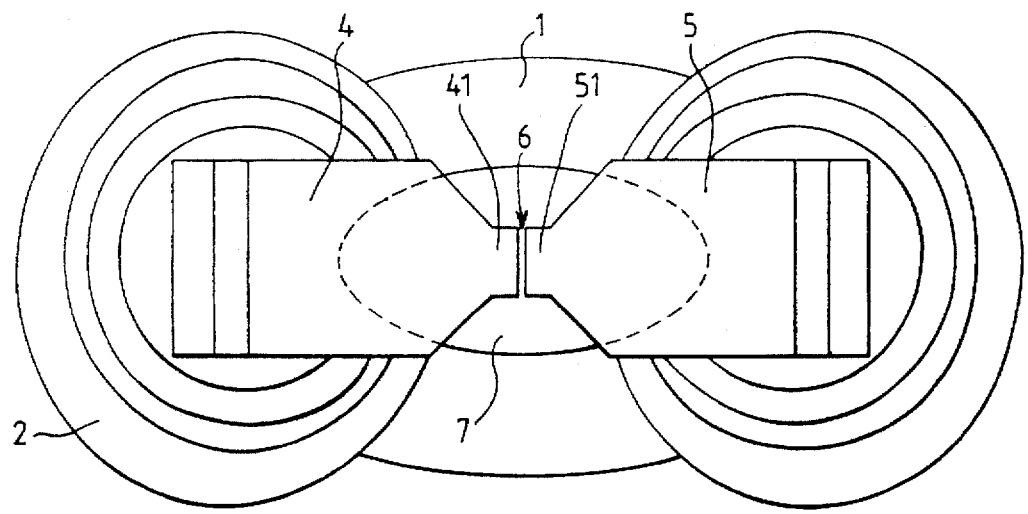
FIGS. 4a and 4b show an exemplary embodiment of a magnetic head according to the invention.
Figure 4B:
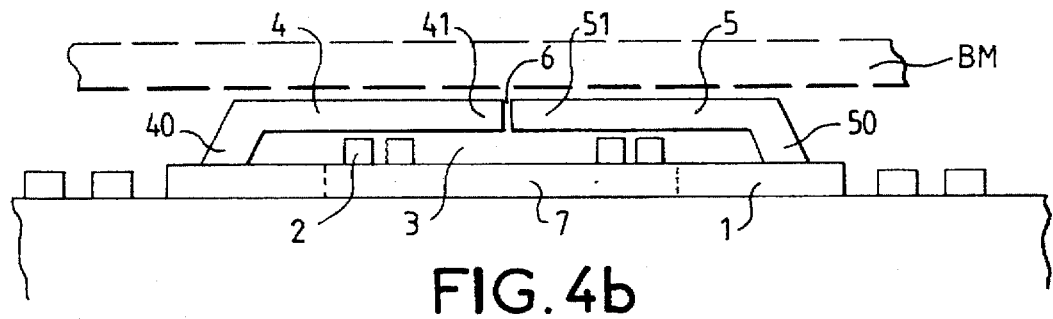

Referring to FIGS. 4a and 4b, a description shall therefore be given of an exemplary embodiment of a magnetic head according to the invention.

Figure 1A:
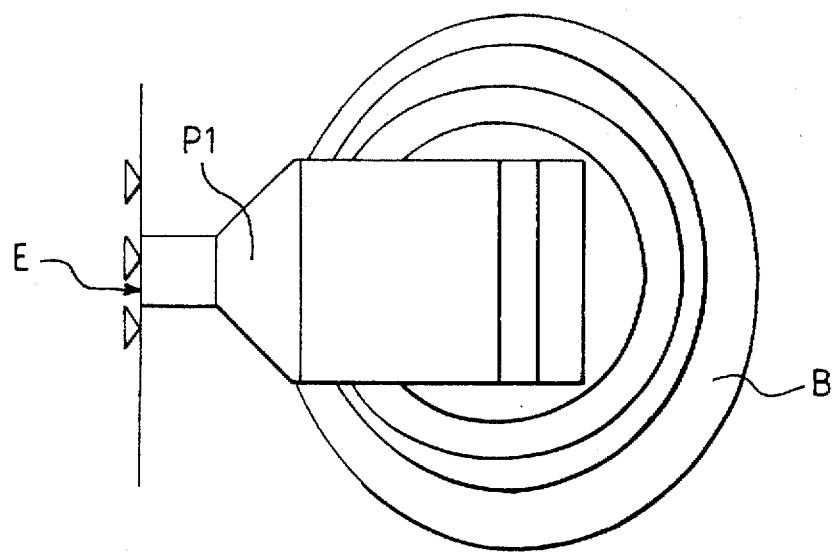
FIGS. 1a, 1b, 2a, 2b and 3 show magnetic recording/reading heads known in the prior art.
Figure 1B:
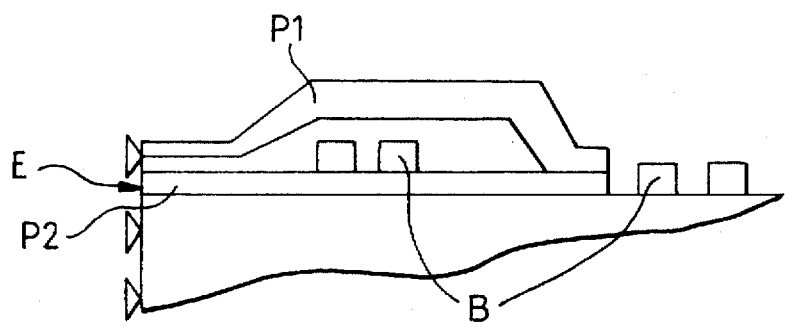
Figure 2A:
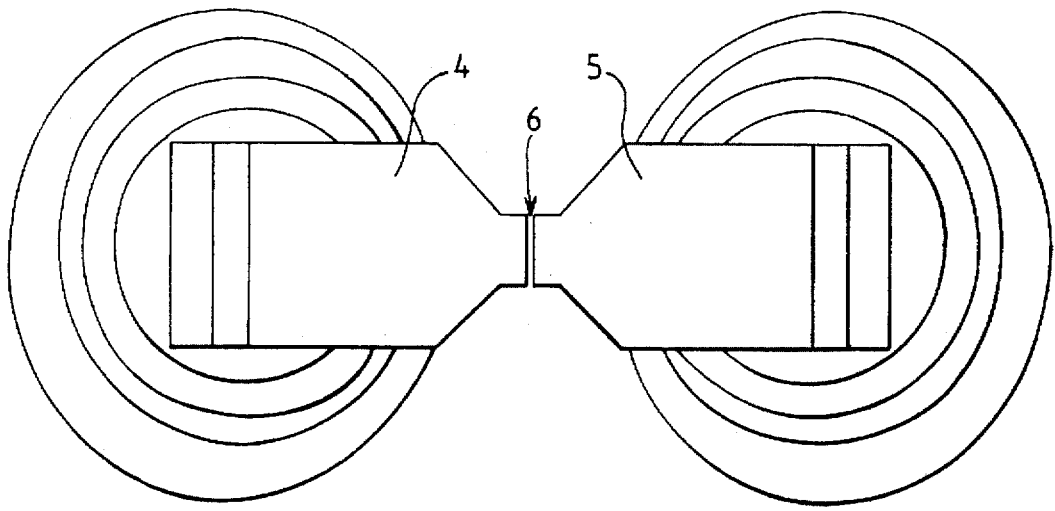
Figure 2B:
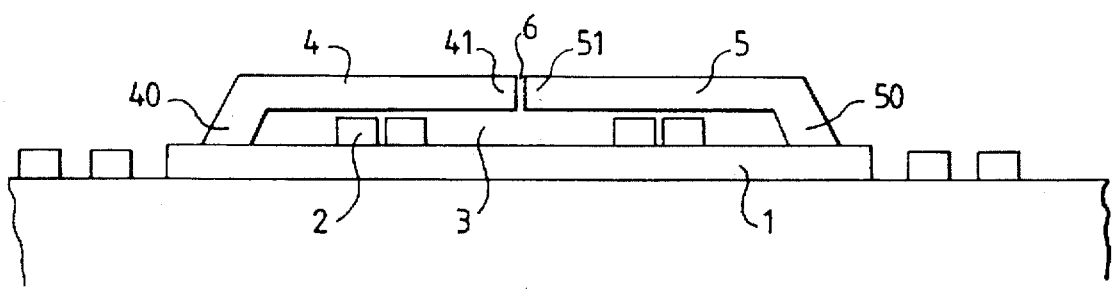
Figure 3:
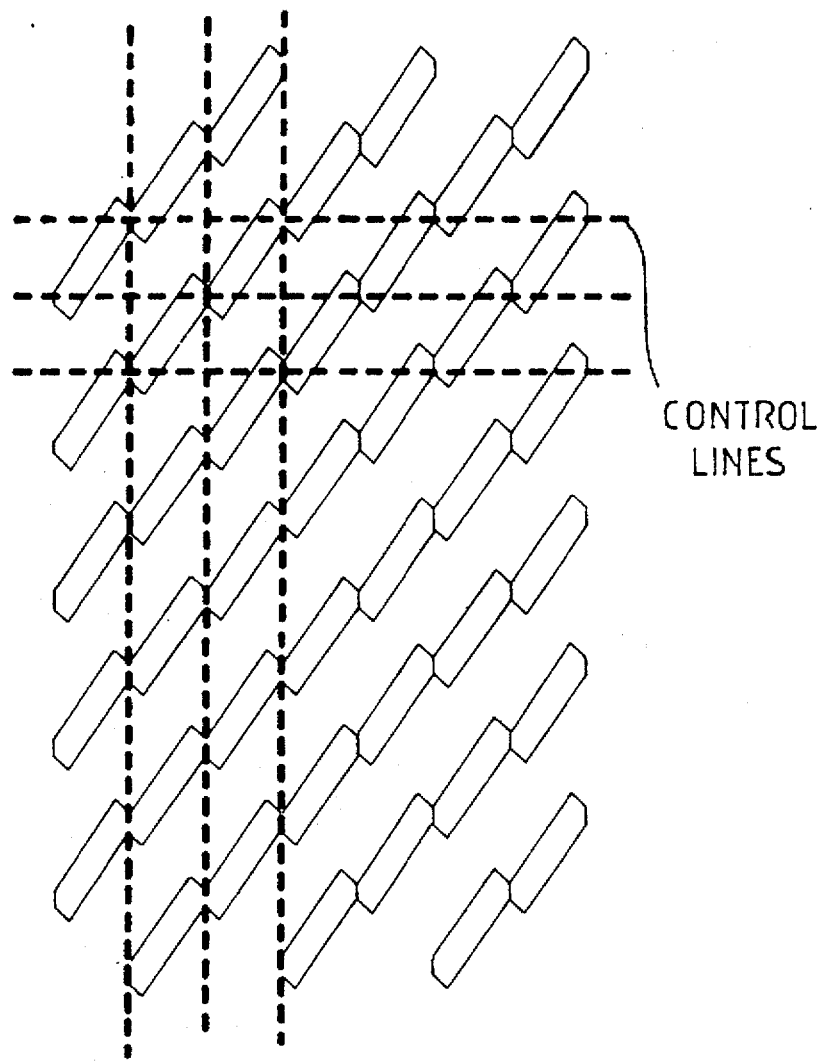

This head, like that of FIGS. 2a and 2b, has a magnetic layer 1 above which there are located two magnetic poles in layers 4 and 5 contained substantially in one and the same plane. These two poles are separated from the layer 1 by an insulating layer. These two poles, at their ends 40 and 50, are magnetically coupled to the layer 1. The opposite ends 41 and 51 of the poles are separated by a gap 6. One coil conductor 2 at least is located beneath one of the magnetic poles to induce a magnetic field. FIGS. 4a and 4b give an exemplary view of two coils each surrounding a pole.

The working of the head will be such as to enable information elements to be recorded on a magnetic information carrier BM such as the one indicated by dashes in in FIG. 4b. This recording will be done by means of the magnetic flux going from the end 41 of the pole 4 to the end 51 of the pole 5.

According to the invention, a zone 7 having no magnetic material is provided in the plane of the magnetic layer 1 beneath the magnetic poles and especially beneath the gap 6. This zone preferably includes the zone located beneath the conductors 2, the poles 4, 5 and the gap 6. It is even possible to envisage a case where the entire zone located beneath the poles is non-magnetic except of course for those parts of the layer 1 that are magnetically coupled to the ends 40 and 50.

Figure 5A:
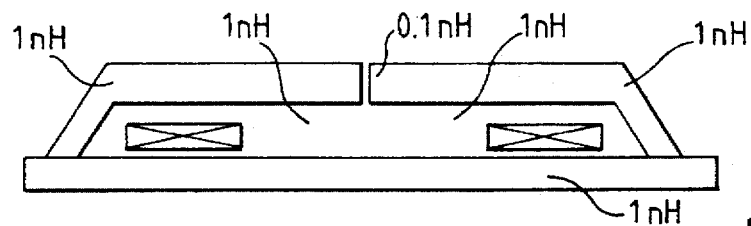
FIGS. 5a and 5b show comparisons of the characteristics of a prior art head and a head according to the invention.
Figure 5B:
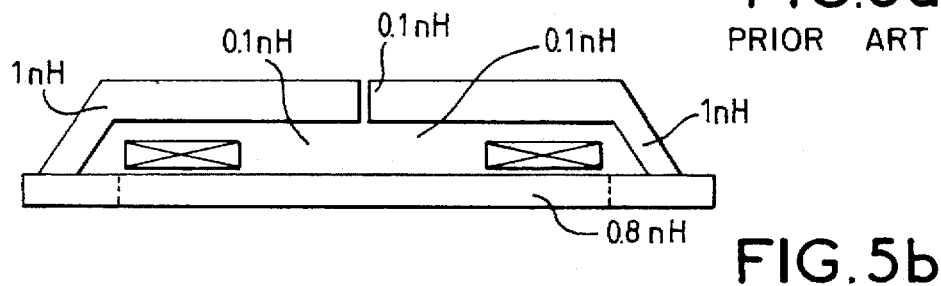
Figure 6A:
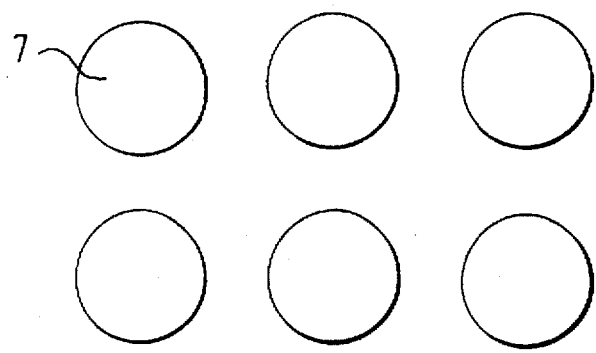
FIGS. 6a to 6c show steps in the making of a matrix head according to the invention.
Figure 6B:
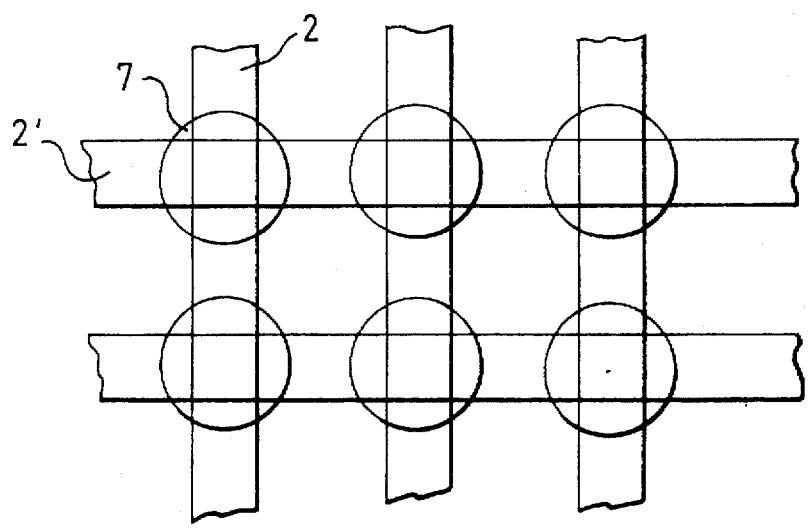
Figure 6C:
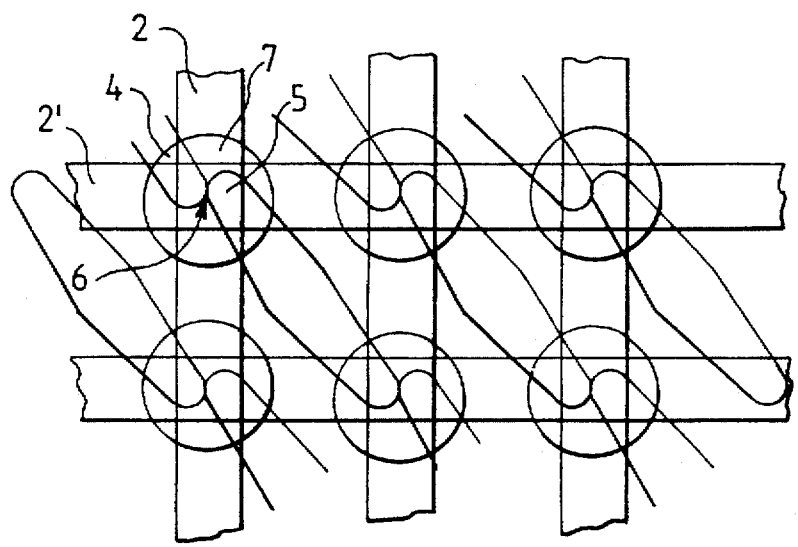

FIG. 5b shows an exemplary view of a magnetic head according to the invention indicating the values of permeance of the different portions of the magnetic circuit. It can be seen that the magnetic head according to the invention (FIG. 5b) provides characteristics that contribute to the making of a magnetic head that is more efficient than the magnetic heads known in the prior art such as that of FIG. 5a.

The invention can be applied to a head with matrix organization comprising several magnetic heads that are activated by magnetic field induction row conductors and magnetic field induction column conductors.

To make such a head, it is planned to make hollows 7 in a magnetic substrate. Row conductors and column conductors 2 and 2' are made. These conductors intersect above these hollows. Then, magnetic poles 4, 5 are made, separated by the gap 6 which is located above a hollow 7.

The poles can be made as described in the French patent application No. 2 605 783.

What is claimed is:

1. A magnetic head comprising:

a magnetic layer;

at least one magnetic field induction conductor positioned on this magnetic layer;

a first zone made of an insulating material including the conductor and covering a part of the magnetic layer;

two magnetic poles made of layers overlapping the zone made of insulator material, each pole having a first end magnetically coupled with the magnetic layer and a second end separated from the second end of the other pole by a gap that is located on the zone made of insulator material;

wherein the plane of the magnetic layer comprises a second zone made of insulator material located beneath the magnetic poles between the first ends and not having any magnetic material, the portions of the magnetic layer coupled to the first ends of the magnetic poles being connected magnetically to one another by at least one element of magnetic material located in the plane of the magnetic layer.

2. A magnetic head according to claim 1, wherein the portions of the magnetic layer coupled to the first ends of the magnetic poles are connected magnetically to each other by two elements of the magnetic layer surrounding the second zone of insulator material.

3. A magnetic head according to claim 1, wherein the second zone corresponds to the first zone.

4. A magnetic head according to claim 1, wherein the second zone is located beneath the conductor.

* * * * *